UNITED STATES PATENT OFFICE.

JAMES W. CAMERON, OF NEW YORK, N. Y., ASSIGNOR, BY MESNE ASSIGNMENTS, TO THE SUGAR-COATED YEAST COMPANY, OF SAME PLACE.

YEAST CAKE.

SPECIFICATION forming part of Letters Patent No. 451,706, dated May 5, 1891.

Application filed September 26, 1890. Serial No. 366,253. (No specimens.)

*To all whom it may concern:*

Be it known that I, JAMES W. CAMERON, of the city, county, and State of New York, have invented a new and useful Improvement in Dry Yeast Cakes; and I do hereby declare that the following is a full and exact description thereof.

My invention relates to the preservation of dry yeast cakes against heat and other climatic influences and from deterioration from exposure to the air.

It has for its object to protect the yeast germs in the cake from the effects of heat as well as of moisture and the influences of the atmosphere.

It consists in enveloping the dry yeast cake with an air-tight and damp-proof coating which is a good non-conductor of heat, and is itself unalterable when exposed to a high temperature as well as to any possible atmospheric conditions. To this end the dry yeast cake manufactured in accordance with any of the approved formulas is coated with a simple paste of rye-flour or of other fine cereal flour or starch, reduced in the customary manner to a pasty condition by means of water or steam, and to which has been added a suitable proportion of refined powdered white talc or chalk, (calcarea carb,) or of lime derived from calcined oyster-shells as an equivalent.

In carrying out my invention the dry yeast cakes are put into a revolving confection-pan heated to a temperature of about 110° Fahrenheit, and are then slightly drenched with a flour-paste reduced to a semi-fluid condition, and to which has been admixed a small proportion of finely-powdered chalk (calcarea-carb) or of oyster-shell lime—say about one pound of chalk or lime to ten pounds of paste. After the cakes have become uniformly and evenly coated with this compound of paste and chalk they are allowed to revolve in the pan until comparatively dry, the drying being accelerated, if occasion require, by dusting the cakes with dry powdered chalk or its equivalent, and finally completed after the cakes are removed from the pan by exposing them to the air until the coating is completely hardened. They are then returned to the pan and again drenched with a second solution of paste containing a larger proportion of powdered chalk or lime—say about one pound of the chalk or lime to four pounds of the paste—and this second coating, after being evenly applied, and if need be dusted with dry chalk or lime, is allowed to dry and harden as before. Finally a third coating of the same pasty solution is applied to the cakes in the same manner, the proportion of chalk or lime in this third solution, being, however, increased so that it shall about equal in weight that of the paste.

The tumbling of the cakes in the confection-pan imparts to the coating a smooth highly-polished appearance, and the coating, by reason of the character of its ingredients, becomes very hard, and is wholly impervious to air, to moisture, and finally to heat, so that the yeast cakes thus prepared and hermetically enveloped may, by reason of the non-conducting properties of the coating thereon, be subjected to temperatures destructive to the yeast germs without having the vitality of the germs therein in the least impaired. The coating, moreover, is not attractive to insects and vermin and will resist their attacks.

I am thus enabled to furnish yeast cakes which will retain their qualities unimpaired in the tropical regions as well as in wet humid climates, and may be shipped and carried without special precautions and without risk of deterioration to any part of the globe without regard to the degrees of heat to which they may be thereby exposed.

The small quantity of chalk or lime required to produce a suitable coating will in no wise affect the quality of the yeast or of the bread made therefrom, while the whiteness and purity of the envelope render the yeast very cleanly and attractive in appearance.

I do not claim, broadly, a protective coating for yeast cakes or other articles of food. The novelty of my invention lies in the use as a coating or shell for the yeast cake of a cereal paste rendered hard, durable, air-tight, moisture-proof, and non-conductive of heat, by incorporating therewith a proportion of talc, chalk, or lime, as set forth.

I claim as my invention—

1. The combination, with a cake of yeast, of an outer protective coat or envelope consisting of a compound of cereal paste admixed with an innoxious powdered mineral substance, substantially as set forth.

2. A yeast cake inclosed in a shell of flour-paste and chalk, substantially in the manner and for the purpose herein set forth.

In testimony whereof I have signed my name to this specification in the presence of two subscribing witnesses.

JAMES W. CAMERON.

Witnesses:
A. N. JESBERA,
E. M. WATSON.